UNITED STATES PATENT OFFICE.

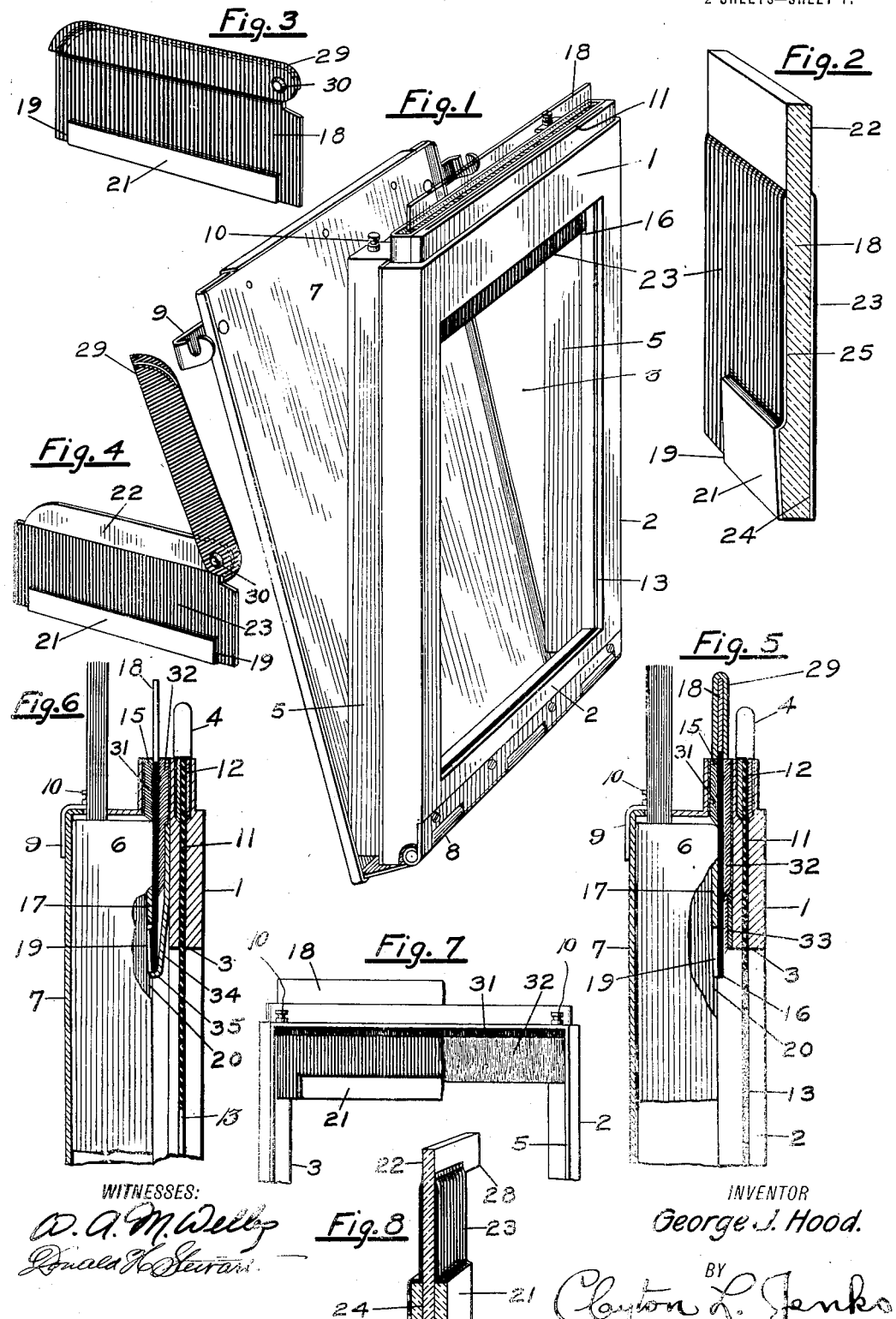
G. J. HOOD.
METHOD AND APPARATUS FOR RECORDING DESIGNATIONS ON PHOTOGRAPHIC ELEMENTS.
APPLICATION FILED AUG. 17, 1916.
1,323,364. Patented Dec. 2, 1919.
2 SHEETS—SHEET 1.
INVENTOR
George J. Hood.

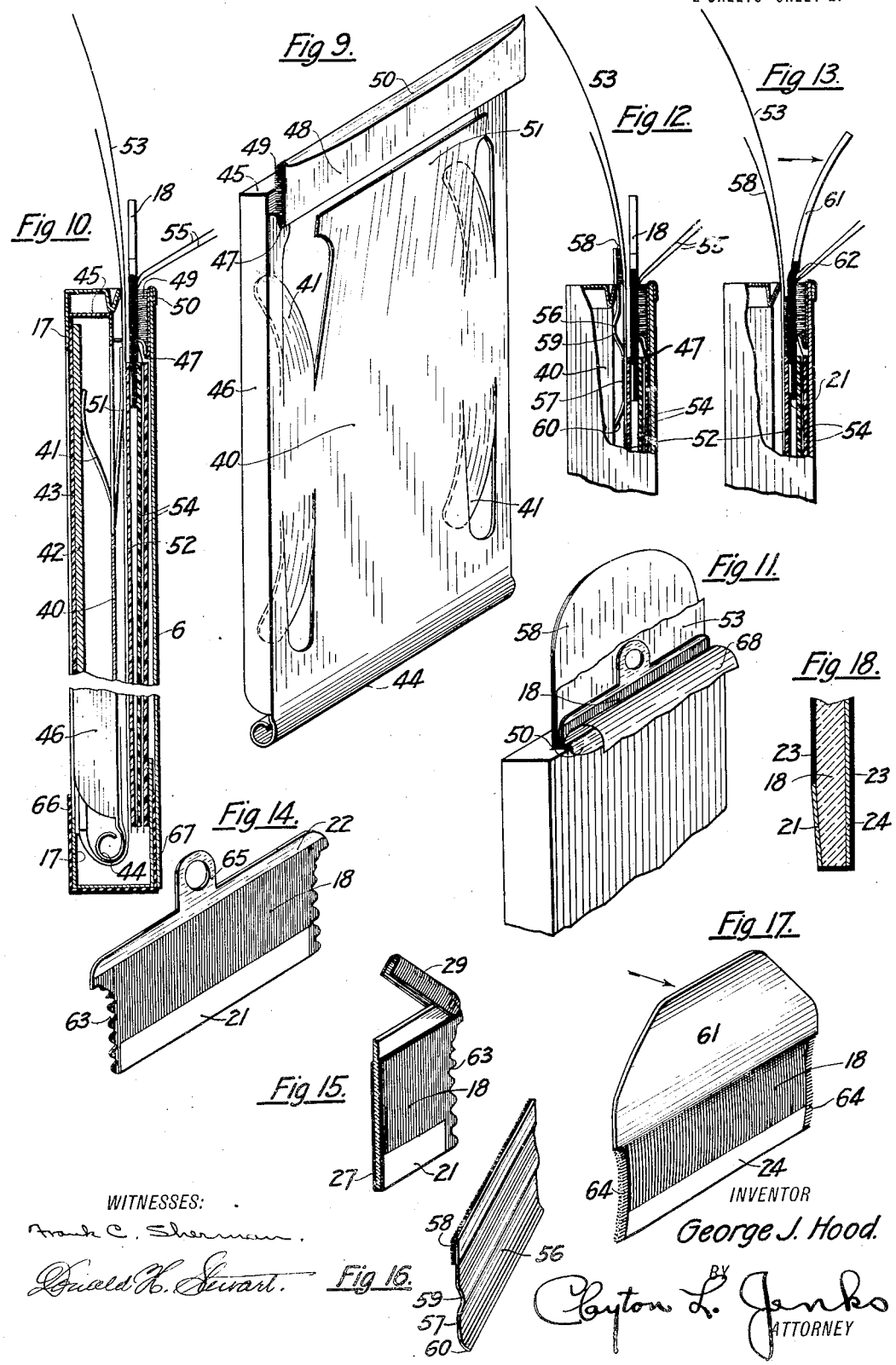

GEORGE J. HOOD, OF LAWRENCE, KANSAS, ASSIGNOR TO EASTMAN KODAK COMPANY, OF ROCHESTER, NEW YORK, A CORPORATION OF NEW YORK.

METHOD AND APPARATUS FOR RECORDING DESIGNATIONS ON PHOTOGRAPHIC ELEMENTS.

1,323,364.        Specification of Letters Patent.        Patented Dec. 2, 1919.

Application filed August 17, 1916. Serial No. 115,432.

*To all whom it may concern:*

Be it known that I, GEORGE J. HOOD, of Lawrence, in the county of Douglas and State of Kansas, have invented certain new and useful Improvements in Methods and Apparatus for Recording Designations on Photographic Elements; and I do hereby declare the following to be a full, clear, and exact description of the same, reference being had to the accompanying drawings, forming a part of this specification, and to the reference characters marked thereon.

My invention relates to photography and more particularly to holders for photographically sensitive elements and a method and means for light recording designations on the contained sensitive element without utilizing a camera lens, and has for its object the provision of a simple, compact, easily manipulated and inexpensive device and a method of operation whereby designating marks may be applied on a tablet outside the holder, placed adjacent the sensitive element and then printed thereon without admitting undesired or injurious light thereto. With this and other objects in view, which will appear from the following disclosure, my invention consists of certain improvements and combination of parts, the novel features of which will be pointed out in the appended claims.

Reference being had to the accompanying drawings in which like reference characters indicate like parts, I have illustrated certain specific embodiments of my invention adapted to a film pack and to an adapter for cut film or a film pack, although this invention is applicable to a camera or other types of holder for photographic material that is capable of use either in a camera or by itself, as *e. g.*, a film pack casing, a film pack adapter or various other forms of holder for photographic films, plates, paper, etc.

In the drawings, Figure 1 represents in perspective view my film pack adapter provided with a light conducting slate.

Fig. 2 illustrates an enlarged perspective view partly in section of the type of slate shown in Fig. 1.

Fig. 3 illustrates a modified form of slate in perspective with the writing surface in view.

Fig. 4 illustrates the slate shown in Fig. 3, with the light cover raised.

Fig. 5 illustrates a central vertical section of a portion of my adapter having a film pack therein shown partly in elevation.

Fig. 6 shows a similar view embodying a modification thereof.

Fig. 7 shows a partial rear plan view of the upper portion of the adapter shown in Fig. 1 with the cover, dark slide and film pack removed.

Fig. 8 shows in section a slightly modified form of writing slate.

Fig. 9 is a perspective view of the metal partition within a film pack.

Fig. 10 is a section partly broken away of an ordinary film pack modified to embody my invention.

Fig. 11 illustrates a perspective partly broken away of the film pack with my writing slate in position.

Fig. 12 shows in section the upper portion of the film pack containing the spring slide illustrated in Fig. 16.

Fig. 13 shows a similar view of the film pack illustrating the use of the slate shown in Fig. 17.

Figs. 14 and 15 show modified forms of my writing slate applicable for use in the film pack.

Fig. 16 illustrates the spring slide.

Fig. 17 shows a form of slate usable in the ordinary film pack construction.

Fig. 18 illustrates in detail a slate having a beveled writing surface.

In the practice of my invention, I am enabled to apply titles to a sensitive element such as photographic film, paper or plate in a light excluding holder by positioning a light conducting slate, having a translucent surface capable of bearing designating marks, in a light locked opening in the holder wall, in such a location that the marked surface may contact with preferably a margin of the element, while a light conducting portion of the slate is exposed at the exterior of the holder to admit light through the opening and slate past the holder light lock to the marked translucent surface and thence to the sensitive element to print the marks thereon.

Referring more particularly to Figs. 1 to 8 inclusive on the drawings, I have shown as one embodiment of my invention a film pack adapter, which may be of any general form, but which is here illustrated as comprising a hollow frame or casing having front exterior peripheral walls involving a wide upper cross piece 1 and narrow side and bottom pieces 2 defining an exposure aperture 3 slightly smaller than but approximately the size of a contained film, which may be closed by a dark slide 4. The casing has a hollow body portion 5 for the reception of a film pack 6 and an aperture for the insertion of the pack, there being provided a door 7 hinged at 8 adapted to be locked by hinged lugs 9 and pins 10 to cover the same, whereby the contained film pack may be protected from actinic light or exposed photographically, as desired. The upper cross member 1 of the adapter frame is provided with a slide opening 11 having a suitable light lock 12 at the top and slideways 13 along the inner margin of the frame front for the dark slide.

In order to print designating marks on the film while contained in the adapter I provide a titling slate or tablet, as illustrated in Figs. 2, 3, 4, and 8, of a suitable material, such as nitrocellulose base, various cellulose compounds, ground glass, etc., which has a translucent or light conducting surface capable of bearing markings thereon and a passageway for light from a light entrance to the translucent marking surface, the remainder of the exterior of the slate being preferably covered with a non-actinic material. While it is possible to insert a suitably constructed titling slate into the dark slide opening of the holder and obtain sufficient contact between the writing surface of the slate and the film to light record markings on the latter, I consider it more desirable to provide a separate opening preferably in the top of the holder especially adapted for this purpose. In accordance therewith I have shown the upper portion of the holder in the rear of the dark slide opening provided with an opening 15 equipped with a suitable type of light lock, which will normally exclude actinic light but permit the insertion of my writing slate to a printing position over the sensitized film. The opening 15 communicates with the space within the holder back of the top cross member 1 and is so located that sufficient room is provided for my slate or a dark slide to pass between the upper cross member 1 and the casing of the film pack 6. A suitable form of stop such as a shoulder 16 on the inside of each side member 2 may be provided, so as to limit the inward movement of the slate.

An essential feature of my invention is the obtaining of substantially intimate or close contact between the translucent writing surface of the slate and the sensitive element in order to produce clear markings, without fogging adjacent portions of the sensitive material. A film pack casing, as ordinarily constructed, has on its front face an overhanging peripheral portion 17 defining the exposure aperture of the pack which projects over the margin of the film to retain the same in position. Since a slate having a plane surface, if positioned parallel to the film, would be held from contact with the film by the margin 17 of the pack casing, I have provided a construction especially adapted for this purpose, as illustrated. This slate 18, which is of a light transmitting material, preferably of nitrocellulose base, due to its flexible qualities, has in the present embodiment of my invention, a thin, flat, uniformly translucent body provided on the surface and preferably near its lower margin with a projection 19, which stops short of the sides of the slate but is preferably of such a length that it may fit snugly between the marginal side edges 17 of the pack casing so as to make a substantial contact over the entire width of a marginal portion of the outer film 20 of the pack that would normally be exposed to light. The face 21 of this projection is flat and comprises a writing surface of any desired or suitable nature. Preferably this is a rough or a matte surface, such that light obstructing markings may be applied thereon by means of a pencil, pen or other suitable writing instrument, but it may be any writing surface, for instance, a suitable non-actinic coating, such as carbon transfer material or aluminum powder, which may be locally removed by the application of a stylus to transmit light through the marked lines. In order that light admitted to the translucent end 22 of the slate, when positioned in the holder, may issue therefrom only through the designation bearing face 21, it is advisable to render all of or at least the lower portion of the slate surface between parts 21 and 22 non-actinic, which I preferably accomplish by means of a coating 23 of black lacquer or any suitable dye, paint, etc.

In order to give quicker and more uniform printing results, the side opposite the matte surfaced projection 19 may be provided with a light diffusing reflecting surface 24, which may be extended to the light entrance 22 at the top of the slate, as illustrated. This reflecting surface is preferably made by coating the slate with a collodion lacquer having zinc oxid or other suitable material therein to render it white, but may be furnished by affixing to the body portion a strip of white nitrocellulose base or other reflecting or diffusing material. Similarly, I find it feasible to cement or otherwise fasten a strip of white nitrocellulose or collodion base to the projection 19 on the slate to form a suitable writing surface, although this may be made in various other ways, as by grinding or roughening the surface of transparent nitrocellulose base. However, I prefer to coat the projection 19 with a suitable translucent material similar to that used for reflecting surface 24, i. e., a thin layer of white collodion lacquer. The remainder of the slate, except the light entrance portion 22 normally adapted to project from the holder for the admission of light, may be similarly provided with a reflecting surface 25 so as to afford a more uniform distribution of light therein. Since there is sometimes a tendency for the film in the pack to give slightly at its margin when pressed against by the projection 19, causing a slight curvature of the surface of the film, I may bevel the projection 19 to a slight extent, as shown in Fig. 2, so that it is of a slightly lesser thickness at its lower than at its upper portion, thus placing the face 21 in a position parallel with that assumed by the film and improving the contact thereby.

In Fig. 8 I have illustrated a modification of my writing slate or tablet, especially adapted for use in connection with certain types of film pack, embodying the general construction above described, and illustrated in Figs. 2, 3 and 4, in which the reflecting surface 24 is positioned only opposite the writing surface 21 and the projecting portion of the celluloid body, as illustrated in Fig. 2, is omitted, the projection 19 and the reflecting surface 24, being formed by cementing white celluloid strips 26 and 27 respectively directly to the flat sheet forming the body of the slate. The heights of the projections 26 and 27 may obviously be regulated to suit the particular needs of the holder construction employed, the showing in the drawing being exaggerated for the sake of clearness of illustration. A projecting shoulder 28 is provided at each end of the clear portion 22 of the slate to limit its movement into the holder by contacting with the top wall thereof, thus obviating the necessity for providing stopping devices 16 within the holder. The types of slate shown in Figs. 2, 3 and 4 may likewise be provided with shoulders 28 if desired. The body of the slate 18 adapted to enter the holder is preferably as wide as the inner compartment of the holder, so that its ends will be concealed behind the slide members 2 when inserted in the holder and its downward motion limited by the shoulder 16. The length or height of the slate is so proportioned relative to the various dimensions of the holders that when the slate is in position the writing surface 21 is opposite a margin of the film 20 in the pack and the upper translucent portion of the slate is exposed to the light at the exterior of the holder.

Since it is ordinarily desirable to apply a titling designation on the photographic element after and not before the picture has been taken, a blank unfogged space should be provided therefor, which may be accomplished by inserting a dark slide into the slate opening before taking a picture. Then the titles may be applied on the mortise or unfogged space thus made by means of a slate similar to that shown in Figs. 1 and 2. To obviate the necessity for utilizing an auxiliary dark slide to form this mortise I prefer to make the slate 18 serve the double function, by providing therefor a removable non-actinic safety cap or cover 29 comprising, as shown in the present embodiment, a double walled hollow envelop of celluloid coated with black lacquer, open at its lower side and shaped to fit closely over the end 22 to meet the non-actinic coating 23 of the slate, to which it is preferably hinged by pin 30. In accordance with this phase of my invention, the desired titling space may be obtained by inserting the slate into the holder with the cover 29 in a closed position before the picture is taken, after which the titling designation may be printed on the photographic film by opening the cover.

As illustrated in the drawings, the slate opening 15 is preferably arranged substantially parallel with the film surface and the front face of the adapter. The slate sliding between the upper crosspiece 1 and the upper portion of the film pack casing is held thereby in proper position for contacting with the films, but in order that the contact between the writing surface 21 and the film may be uniform and close, it is advisable to provide a resilient means or a cushion in the front of the slate to thrust it rearwardly against the film beneath the margin of the pack casing. For example, the construction shown in Fig. 5, may be adopted, in which case plush or other long napped cloth 31 and 32 is used as a lining and light lock for the slate opening, the naps facing each other and being of sufficient length to afford an effectual light obstructing closure which allows insertion of the writing tablet therethrough. The plush covering 31 on the rear face of the opening extends only through the depth of the light lock, while the lining 32 is extended to cover the whole inner surface of the upper cross member 1. A second piece of plush 33 is added to reinforce the piece 32 at its lower portion to furnish a projecting springy cushion of material to hold the designation bearing surface 21 of the slate against the film with a gentle but firm pressure, without materially distorting the film surface or otherwise moving it out of the focal plane of exposure. I may, however, provide, as shown in Fig. 6, a metal spring or other resilient means 34 fastened at its upper end to the rear wall of the upper cross member 1 and projecting downwardly and rearwardly toward the film. The resilient member, which preferably extends the width of the inside of the holder, and is made of a non-actinic material so as to form a light shield, has a bentover lip 35 which normally makes a substantial contact with the film 20 lying in the focal plane of exposure at a point just below the portion designed for the designation, thus serving to prevent any light from materially affecting the film below the title portion, if admitted through the slate opening or the slate, in case the slate covering 23 is omitted. When the slate is inserted in the adapter shown in Fig. 6, and strikes the resilient member 34, it forces the same forwardly toward its support until the projection on the slate has cleared the lower edge of the margin of the pack casing, whereupon the resilient spring thrusts the slate rearwardly into substantial contact with the film.

The operation of this device has been made apparent from the above description. If it is desired to apply the titling designation to an unexposed margin of the sensitive element after a picture has been taken, by means of my slate having a safety cap, one may make the desired markings on the translucent surface 21 of the slate while outside the holder and insert the same into the holder, with the safety cover closed, to a position over the film, as determined by the stops 16 on the holder or by shoulders 28 on the slate, while the remainder of the film is protected from light by suitable means such as the dark slide 4, if the holder is outside of the camera, or by the camera walls and shutter, if within the camera. After the photographic exposure has been made, the cap 29 is raised and light entering the translucent portion 22 of the slide, passes edgewise, so to speak, of the slate between the non-actinic coatings 23 to the translucent face 21 and thence around the markings thereon to the film, thus making a light record of the same, which may be brought out by development or otherwise rendered visible by suitable photographic operations. Various changes in the method of manipulation are obvious. If it is not desired to apply designations, the photographic exposure may be made to cover the entire film surface normally exposed in the pack; or after the entire surface has been exposed, a titling designation may be superimposed thereover by the method described above. Similarly the writing may be made on the slate after the blank unexposed film margin has been provided, by withdrawing the slate from the holder, writing thereon and reinserting it. After the slate has been used it may be withdrawn and the marks erased or saved for future service, the slate being usable repeatedly.

In order that designations may be directly applied on the sensitive element in a film pack casing or other similar holder for cut film without the aid of an auxiliary adapter, or in order that the markings may be applied at the top of a film as well as the bottom thereof in my special form of holder above described, I have provided a simple method and construction involving the use of one of my types of writing tablet, wherein the latter may be inserted directly into the film pack casing or holder itself for printing marks on the contained film.

In the ordinary type of film pack, a resilient pad or partition divides the casing or holder into two compartments, one adjacent the front opening for the exposure of film, the other in the rear for the storage of exposed film. In order that an exposed film may be moved to allow exposure of a second film located behind it, a film tab of paper attached to the lower portion of each film is passed beneath the pad, which is shorter than the body of the holder to allow proper clearance, then up through the storage chamber behind the pad and out through a light locked tab opening in the top of the holder. By drawing on the tab of the exposed film, the latter is removed from the exposure chamber to the storage chamber with its end nearest the tab adjacent the light locked opening which is too small to allow passage of the film. The proximity of this opening to the exposed film permits the application of designating marks on the film by means of my slate, as will be described. If a slate is inserted through the light locked film tab opening in the rear of the tab, after the film has been drawn from the exposure position into the storage chamber, with the writing surface facing toward the front of the pack in contact with the sensitive surface of the film, light will traverse the slate through the tab opening to print a designating mark on the film.

Since there must be a close or intimate contact between the writing surface of the slate and the sensitive surface of the film, it is desirable to provide a resilient pressure tending to thrust the film and slate relatively toward each other. In accordance with one phase of my invention, I provide the construction shown in Figs. 9 and 10 for accomplishing this purpose. In the usual type of film pack, as here illustrated, the casing 6 has disposed therein a metal partition 40 carrying forwardly projecting spring arms 41 which bear against a press board backing 42 located in front of the partition, the two parts 40 and 42 forming a resilient pad which divides the casing into an exposure chamber and a storage chamber. The press board backing 42 presses against the rear of the unexposed films 43 in the exposure chamber, of which but one is shown in the drawing, to hold the outermost film against the overhanging margins 17 of the pack casing 6 and in the focal plane of exposure within the camera. The lower portion of partition 40 has a rolled-over edge 44 spaced from the casing to allow sufficient clearance for the passage of a film thereneath.

The metal partition 40 is ordinarily fixed or immovably held in the casing, as illustrated, by means of the forwardly turned marginal flanges 45 and 46 which bear against the front of the casing, and the rearwardly projecting flanges 47 near the upper corners of the partition 40 bearing against the casing, thus permitting the exposed films to be loosely carried in the storage chamber. The projecting flanges 47 are separated from each other by a distance sufficient to allow the passage of a film tab between them but serve as stops to limit the outward movement of a film which is wider than its tab. An upwardly bent strip 48 is supported by the flanges 47 parallel with, but separated from the main body of partition 40, and carries a suitable material 49, such as long napped plush, on its inner face to form a light lock, thus preventing the admission of undesired light during the manipulation of the film tabs and the insertion of the writing slate to a position adjacent the film. The upper end of strip 48 has a downwardly turned lip 50 adapted to engage the upper part of the casing 6 as shown in Figs. 10 and 11 to fix the upper part of the partition 40 immovably relative to the casing.

In order to hold the upper portion only of a film against the writing tablet without binding the films throughout their entire areas and thus avoid a consequent liability of scratching or injuring the sensitive surfaces, I form from the metal partition 40 a rearwardly projecting spring finger 51 so located that when a film has been drawn completely around into the storage chamber its upper portion will be positioned in the rear of the finger. The finger 51 is so adjusted that it will tend to thrust a film rearwardly with sufficient pressure that when the slate is inserted through the light locked opening of the pack behind the last exposed film 52 and its tab 53 but in front of any previously exposed films 54 and their tabs 55, as shown in Figs. 10 and 11, the slate will be held in proper contact with the sensitive surface of film 52 for printing designations thereon.

Since the above described means of applying designations to a film involves changing the construction of the ordinary film pack, I may, if desired, accomplish the same results by means of an auxiliary pressure member, not a part of the pack casing but insertible into the light lock, to secure the necessary contact between film and slate. This member may, as illustrated in Figs. 12 and 16, take the form of a somewhat S-shaped plate 56 of resilient material, such as metal, having a flat surface portion 57 adapted to contact with the film tabs and exert pressure thereagainst. Plate 56 has preferably a strip of plush 58 at its upper portion on the same side as the projection 57 adapted to help in preventing the entrance of light through the light lock. As shown in Fig. 12, the plate 56 has a width substantially equal to the distance between members 47 of the tab slot in the casing, and such a height that when part 57 is opposite the upper marginal portion of the film 52 the light locking material 58 is contacting with the film tab, and the slide is inserted to its utmost extent into the casing. The height of the projection 57 is so determined that when the forwardly projecting parts 59 and 60 of the S-shaped member 56 contact with the partition member 40 the film tabs and the upper margins of any films that may be present are pressed rearwardly toward the wall of the casing 6 to such an extent that upon insertion of the writing tablet 18 intimate contact may be had between the writing face 21 thereof and the front film 52.

For convenience and simplicity in manipulation, I may substitute a single member for the spring plate 56 and the writing tablet 18, as illustrated in Fig. 13. In accordance with this phase of my invention, the writing tablet 18, which may be constructed similarly with any of the forms previously described with respect to the part which is adapted to be inserted into the film pack, is provided with a long flexible portion 61 (Figs. 13 and 17) serving as a handle by means of which pressure applied in the direction of the arrow shown in Figs. 13 and 17 tends to rotate the slate 18 about the light locked upper end of the casing as a fulcrum and thereby thrust the writing surface 21 into contact with the film to be printed upon, the resiliency of the member 18 serving to permit the writing face 21 to lie parallel with the upper margin of the film. The slate may have an S-shaped bend 62 (Fig. 13), the upper portion of which serves as a light entrance. The part of the slate adjacent and above the writing surface 21 is normally bowed with its convex surface toward the rear of the plate as shown in Fig. 17, this convex surface becoming approximately straight when pressure is applied to the upper portion of the tablet in the direction of the arrow to force the writing face against the film.

While writing slates in the forms previously described are applicable for use in the film pack, I prefer the forms illustrated in Figs. 14, 15, 17 and 18, wherein the portions 26 and 27 have their surfaces flush with the outer faces of the slate to afford easy penetration into the casing, and to obviate the admission of light due to the entrance of a thickened portion through the light lock. (See Figs. 10, 12 and 15.) The writing face 21 of this tablet may, if desired, be beveled as shown exaggerated in Fig. 18 to permit the face to contact evenly with the film without distorting the latter. The parts 26 and 27 may each be made of a translucent white material and not be covered with the black lacquer or other such non-actinic material, so that each may furnish a writing face and a light reflecting and diffusing medium opposite the other, as illustrated in Fig. 15. As shown in Fig. 17, the reflecting surface 24 may be left uncovered when adaped to be used in a film pack.

To avoid admission of light through the light lock around the ends of the writing slate, I may form the edges thereof with serrations 63 so that upon the insertion of the slate into the lock lock past the nap of the plush 49, the nap tends to stand up in the serrated portions 63 between the projections and so form a zig zag line along which the light cannot pass. When desired, light lock material, such as threads or long napped cloth may be placed on the sides or the edges of the slate. As shown in Fig. 17, closely positioned threads 64 may be cemented to the edges of the slate. As illustrated in Fig. 14, the light entrance portion of the writing tablet 18 may be provided with a projecting handle 65 perforated if desired for convenience in handling. If a safety cap 29 such as shown in Fig. 15 is utilized, the admission of light to the film can be easily regulated, although this feature is not wholly essential to a satisfactory operation of my method.

Since the designating marks are applied at the top of the picture portion of the film, or, as illustrated in Fig. 10, at the lower portion of the front unexposed film 43, it will be necessary to blank off a portion of this film in order to have a clear background for the writing, unless a sufficiently wide portion of the film remains normally unexposed behind the lower margin 17 of the film pack casing, or unless one desires to superimpose the designations on a previously exposed picture portion. To form this blank any suitable means may be provided to lengthen the lower margin 17 of the casing, as, for example, a sticker pasted over the casing before insertion into the pack, or a U-shaped clip of non-actinic paper 66 located over the lower end of the casing, or, as illustrated, with the rear portion 67 of paper 66 inserted into a slot in the back of the film pack casing. This slot is located between the rear wall of the casing 6 and the flap 67 forming an extension of the bottom of the casing which is inserted in front of the rear wall to form a light tight closure and permit exposed films to be withdrawn from the storage chamber. The portion of the paper 66 projecting above the lower margin 17 of the casing should be of such a width as to provide the right amount of unexposed film surface for the printed designations.

The manner of carrying on my method involving the use of the construction shown in Figs. 9, 10, and 11 is as follows. If it is desired to place titles on the films, the blanking strip 66 is preferably placed on the lower portion of the pack and the whole inserted into the camera. The usual paper safety cover 68 which is a removable closure for the exposure aperture over the films is withdrawn to the rear of the film holder, but the tab or a projecting portion thereof is not torn off and the first photographic exposure is made, after which the exposed film is moved beneath partition 40 to the storage chamber by pulling out its corresponding tab, the whole of the tab or a projecting portion thereof similarly being left attached to the film. The desired designations are written on the slate 18 by means of an ordinary pencil or other suitable medium, and the slate is inserted through the light lock in front of the safety cover tab, but in rear of the tab of the first film with the writing face toward the front of the pack and contacting with the sensitive film face and is left there for the desired length of time to print the designations on the film, after which it is withdrawn. When a second photographic exposure has been made and the second film drawn into the storage chamber, the writing tablet should then be similarly inserted with its designating face toward the front of the casing and the film to be printed between the projecting tab of the first film and the projecting tab of the second one. After each printing operation all but one of the previously drawn projecting tabs may be torn off, the last one being left until the next film has been exposed and printed.

The operation of the constructions shown in Figs. 12 and 13 is obvious from above disclosure. In the form shown in Fig. 12 the spring plate 56 is inserted in front of all of the tabs before the printing operation is carried out and may be left in place during the exposure of the whole pack, the writing slate being inserted in the light locked tap opening, as before mentioned, between the tab of the film to be printed and that of the film previously exposed with its surface 21 adjacent the sensitive surface of the film.

In the form shown in Fig. 13, after the writing slate 18 has been properly inserted in position in the pack the handle portion 61 is immediately pressed rearwardly in the direction of the arrow shown in Figs. 13 and 17 to thrust the writing surface forward and make the necessary contact between it and the film until sufficient time has been given for the printing operation, after which the slate is removed.

If it is desired to apply designations at the bottom of the picture as well as or instead of at the top of the picture, constructions similar to those described in Figs. 1 to 8 inclusive may be employed, and operated as above set forth. By utilizing my special types of holder or adapter in connection with my film pack construction and method of operation, one may apply a designation at will either on the top or the bottom of a photographic element without utilizing the camera body or lens as an aid in the operation.

It will be understood that the usual photographic operations such as developing the latent image, fixing, washing, drying, etc., will be carried out as desired to make a permanent record of picture and title designations, although such do not form any part of my invention.

Having thus described my invention, what I claim as new and desire to secure by Letters Patent is:—

1. In combination with a holder for a photographically sensitive element having marginal exterior walls in front of and adjacent an element to be exposed, which define an exposure aperture of approximately the size of the sensitive area adapted to record a picture, a member communicating with the exterior of the holder and having a translucent portion capable of bearing designating marks thereon contacting with a sensitive element in said holder, said member having a light conducting passage for admitting light independently of the exposure aperture through said holder to the translucent portion of the member to light record such marks on the sensitive element.

2. In combination with a holder for a plurality of cut photographically sensitive elements, having a light locked opening in one end and exterior walls adjacent the front element defining an exposure aperture substantially the size of the element, a translucent slate capable of bearing designating marks on a portion thereof and insertible into said opening to admit light therethrough and means to hold said designation bearing portion in contact with a sensitive element, whereby light transmitted through said slate and opening may record the designations on the element.

3. In combination with a holder for a sensitive element having an opening in a wall communicating with said element and a light lock therefor, said opening being substantially as long as the width of the element, a long narrow translucent slate provided on a margin adjacent a longer side with a flat writing surface capable of bearing designating marks thereon, said slate being partially insertible into said opening with its longer sides parallel thereto so that the writing surface may contact with the sensitive element, said slate having a light passage to transmit light uniformly from the opening through the narrow width of the slate to the writing surface to record the marks on the element.

4. The combination with a holder having a chamber for the storage of a plurality of parallel photographically sensitive elements and a light locked opening communicating with the space adjacent a surface of one of said elements, of a light conducting slate insertible into said opening and having a surface adapted to bear designating marks thereon and means for providing a printing contact between said surface and a marginal portion only of the element whereby the markings may be recorded on the margin of the element by light admitted through said slate and opening.

5. In combination with a film pack having a plurality of cut films provided with manipulating tabs and an opening in the casing for drawing a film from an exposure position to a storage position by means of its tab, a light conducting slate capable of bearing designating marks thereon positioned in said opening adjacent a film and means for providing a printing contact between said slate and said film whereby such marks may be light recorded on the film.

6. In combination with a film pack having a plurality of cut films provided with manipulating tabs and an opening in the casing for drawing a film from an exposure position to a storage position by means of its tab, a light conducting slate capable of bearing designating marks thereon positioned in said opening adjacent a film and resilient means in said pack for thrusting a marginal portion of said film and said slate relatively into intimate contact, whereby the markings may be recorded on the film by light transmitted through said slate and opening.

7. In a film pack having an exposure opening, a partition disposed therein to divide the pack into an exposure chamber adjacent said opening and a storage chamber for exposed films, means for moving an exposed film from the exposure chamber to the storage chamber and a spring arm on said partition adapted to resiliently thrust the upper end of a film in the storage chamber toward the rear of the casing.

8. In combination with a film pack having an exposure aperture and a light locked opening adjacent a contained film, a holder having an exposure aperture coinciding with the aperture of the pack, and means for applying at will an arbitrary designating mark on the top or the bottom of a picture portion of a photographic film.

9. In combination, a package containing a plurality of parallel photographically sensitive elements, exposure and storage chambers for said elements, a container into which said package as a whole may be placed for exposure of the elements, and means for applying a legend to one end of each element while in storage position in the package, and for applying a legend to the opposite end of each element while in exposure position in the container.

10. A slate for light printing designating marks on a photographically sensitive element in a holder, comprising a body portion having a translucent surface capable of bearing designating marks thereon, a light conducting entrance and passage to said surface and a reflector on that side of said passage which is opposite the translucent surface, whereby light admitted at the entrance may be transmitted to the surface.

11. A slate for light printing designating marks on a photographically sensitive element in a holder comprising a light conducting plate having a translucent writing face capable of bearing designating marks thereon, a light diffusing reflector opposite the writing face and a non-actinic covering on the plate adjacent said face, the plate having an uncovered exterior light entrance and an interior translucent passage capable of admitting light through the interior of the plate to the translucent face.

12. A slate for insertion into the light lock of a holder and light printing designating marks on a photographically sensitive element therein, comprising a plate having a translucent face capable of bearing designating marks thereon, a light conducting entrance and passage to admit light therethrough to the translucent face, and means on said plate to limit its movement into said light lock.

13. A slate for light printing designating marks on a photographically sensitive element in a holder comprising a translucent plate having an exposed translucent writing surface near its lower margin, a non-actinic covering over the remaining lower portion of the plate defining a light conducting passage from the upper uncovered light entrance portion of the plate to the writing surface and a movable non-actinic cap slidable over the upper uncovered portion to close said light entrance.

14. A slate for light printing designating marks on a photographically sensitive element in a holder comprising a thin plate, a beveled face near one margin of the slate and sloping toward said margin, a translucent matte surface on the beveled face capable of bearing designating marks thereon and an interior light passage to the beveled face from a light entrance at another portion of the plate.

15. The method of applying designations to a film in a film pack, comprising a plurality of films withdrawable from an exposure chamber into a storage chamber by means of a film tab manipulatable through a light locked opening while undesirable light is excluded, comprising the steps of drawing said film by means of its tab from the exposure position into a printing and storage position adjacent said opening and providing a slate with the desired markings, then inserting said slate into the light locked tab opening of the pack immediately in the rear of the film tab with the writing surface of the slate facing forwardly in contact with the sensitive surface of the film to be marked while maintaining the light entrance of the slate exteriorly of the pack, and admitting printing light to the film through said slate to the film to record the markings thereon.

16. The method of applying designations on a film in a film pack comprising a plurality of films withdrawable from an exposure position to a storage position by manipulating the film tabs through a tab opening in the pack, comprising the steps of blanking off a portion of the film from exposure, exposing the film to record a photographic subject thereon, pulling the tab of the exposed film and drawing the latter from its exposure position to the space adjacent the tab opening, inserting a light conducting marked slate into the opening in the rear of the tab with the markings on the slate contacting with the film, admitting light to the film and markings through said slate and opening and thereby recording the markings on the film, tearing off all but a small projecting portion of the tab of the exposed and marked film, leaving this portion until the next film has been marked and repeating the steps as desired with the other films.

In witness whereof I affix my signature this 12th day of August, 1916, in the presence of two witnesses.

GEO. J. HOOD.

Witnesses:
A. C. BAKER,
H. A. ROHRER.